(12) United States Patent
Kropp et al.

(10) Patent No.: US 9,618,076 B2
(45) Date of Patent: Apr. 11, 2017

(54) STATIONARY VIBRATION ISOLATION SYSTEM AND METHOD FOR CONTROLLING A VIBRATION ISOLATION SYSTEM

(71) Applicant: Integrated Dynamics Engineering GmbH, Raunheim (DE)

(72) Inventors: Peter A. Kropp, Mainz (DE); Peter Kluth, Niedernhausen (DE)

(73) Assignee: Integrated Dynamics Engineering GmbH (DE)

( * ) Notice: Subject to any disclaimer, the term of this patent is extended or adjusted under 35 U.S.C. 154(b) by 302 days.

(21) Appl. No.: 14/165,091

(22) Filed: Jan. 27, 2014

(65) Prior Publication Data

US 2014/0209779 A1 Jul. 31, 2014

(30) Foreign Application Priority Data

Jan. 29, 2013 (EP) .................... 13153155

(51) Int. Cl.
| | | |
|---|---|---|
| F16M 13/00 | (2006.01) | |
| F16F 15/00 | (2006.01) | |
| F16F 15/02 | (2006.01) | |
| F16F 9/53 | (2006.01) | |
| F16F 15/027 | (2006.01) | |

(52) U.S. Cl.
CPC ............ *F16F 15/005* (2013.01); *F16F 9/532* (2013.01); *F16F 9/535* (2013.01); *F16F 15/022* (2013.01); *F16F 15/027* (2013.01); *F16F 2224/041* (2013.01); *F16F 2224/043* (2013.01); *F16F 2224/045* (2013.01)

(58) Field of Classification Search
USPC ........................................................... 248/550
See application file for complete search history.

(56) References Cited

U.S. PATENT DOCUMENTS

| | | | | |
|---|---|---|---|---|
| 4,261,689 A | * | 4/1981 | Takahashi ............ | F04B 35/045 417/417 |
| 4,452,437 A | * | 6/1984 | Lochner ................. | B60R 19/54 188/289 |
| 4,742,998 A | * | 5/1988 | Schubert ............... | B64C 27/001 137/807 |
| 4,757,980 A | * | 7/1988 | Schubert ............... | F16F 15/027 248/550 |
| 4,828,533 A | * | 5/1989 | Focqueur ............. | F16F 15/137 192/55.1 |
| 5,052,529 A | * | 10/1991 | Sutcliffe ................ | G05D 19/02 188/378 |
| 5,094,407 A | * | 3/1992 | Jampy ...................... | F16F 9/06 244/104 FP |
| 5,379,980 A | * | 1/1995 | Houghton, Jr. ..... | F16F 15/0232 248/550 |
| 5,409,078 A | * | 4/1995 | Ishioka ................ | B60G 17/018 180/300 |
| 5,465,924 A | * | 11/1995 | Schneider .............. | G01C 21/18 244/118.1 |

(Continued)

*Primary Examiner* — Monica Millner
(74) *Attorney, Agent, or Firm* — Kaplan Breyer Schwarz & Ottesen, LLP

(57) ABSTRACT

The invention relates to a stationary vibration isolation system and to a method for controlling such a system which comprises a damper effective in a horizontal direction which includes a fluid of variable viscosity.

19 Claims, 6 Drawing Sheets

(56) References Cited

U.S. PATENT DOCUMENTS

| | | | | |
|---|---|---|---|---|
| 6,022,005 | A * | 2/2000 | Gran | F16F 15/005 244/164 |
| 6,036,162 | A * | 3/2000 | Hayashi | F16F 15/00 248/550 |
| 6,082,719 | A * | 7/2000 | Shtarkman | F16F 9/53 188/266.7 |
| 6,123,312 | A * | 9/2000 | Dai | F16F 9/53 188/378 |
| 6,327,024 | B1 * | 12/2001 | Hayashi | F16F 15/02 188/267 |
| 6,375,147 | B1 * | 4/2002 | Radziun | G01R 33/3854 248/550 |
| 6,644,590 | B2 * | 11/2003 | Terpay | B64C 27/001 188/378 |
| 6,874,748 | B2 * | 4/2005 | Hanagan | F16F 7/1005 248/550 |
| 7,158,213 | B2 * | 1/2007 | Galburt | G03F 7/709 248/638 |
| 7,532,951 | B2 * | 5/2009 | Sato | G05D 19/02 700/170 |
| 7,554,105 | B2 * | 6/2009 | Franken | G03F 7/709 250/442.11 |
| 7,689,385 | B2 * | 3/2010 | Shen | G01M 13/028 264/40.1 |
| 7,942,379 | B2 * | 5/2011 | Heiland | F16F 15/002 188/378 |
| 8,231,098 | B2 * | 7/2012 | Ryaboy | 188/378 |
| 8,857,585 | B2 * | 10/2014 | Ryaboy | 188/380 |
| 9,081,307 | B2 * | 7/2015 | Hol | G03F 7/70758 |
| 9,280,069 | B2 * | 3/2016 | Kawamura | G03F 7/70791 |
| 9,371,883 | B2 * | 6/2016 | Wehr | F16F 9/52 |
| 2001/0040324 | A1 * | 11/2001 | Mayama | F16F 15/02 267/136 |
| 2002/0117109 | A1 * | 8/2002 | Hazelton | G03F 7/707 118/620 |
| 2003/0057346 | A1 * | 3/2003 | Wakui | F16F 15/02 248/550 |
| 2003/0057618 | A1 * | 3/2003 | Tanner | B60G 13/14 267/136 |
| 2004/0099784 | A1 * | 5/2004 | Kienholz | F15B 15/088 248/550 |
| 2004/0195062 | A1 * | 10/2004 | Anderfaas | F16F 9/535 188/267.2 |
| 2005/0045821 | A1 * | 3/2005 | Noji | G01N 23/225 250/311 |
| 2007/0164189 | A1 * | 7/2007 | Corsaro | F16F 15/08 248/614 |
| 2008/0048405 | A1 * | 2/2008 | DeLorenzis | B60G 17/0432 280/6.159 |
| 2010/0211225 | A1 * | 8/2010 | Heiland | F16F 15/002 700/280 |
| 2010/0301530 | A1 * | 12/2010 | Koyama | F16F 13/268 267/140.14 |
| 2011/0017555 | A1 * | 1/2011 | Battlogg | F16F 9/46 188/267.2 |
| 2011/0062306 | A1 * | 3/2011 | Heiland | F16F 15/027 248/636 |
| 2011/0139557 | A1 * | 6/2011 | Mangelschots | F16F 9/464 188/322.13 |
| 2014/0209778 | A1 * | 7/2014 | Evers | F16F 15/063 248/550 |

* cited by examiner

STATIONARY VIBRATION ISOLATION SYSTEM AND METHOD FOR CONTROLLING A VIBRATION ISOLATION SYSTEM

CROSS-REFERENCE TO RELATED APPLICATIONS

European Patent Application No. 13 153 155.0, with a filing date of Jan. 29, 2013, is incorporated herein by reference.

FIELD OF THE INVENTION

The invention relates to a stationary vibration isolation system which is used in particular in semiconductor industry for accommodating lithography apparatus, and further relates to a method for controlling such a vibration isolation system.

BACKGROUND OF THE INVENTION

Stationary vibration isolation systems such as those used for mounting lithography apparatus are known in practice.

Such a vibration isolation system typically comprises mechanical or pneumatic springs on which a table or frame is mounted with vibration isolation, which table or frame serves to receive a lithography apparatus to be isolated.

Further, such vibration isolation systems are typically configured as so-called active vibration isolation systems in which sensors are provided at the anti-vibration mounted load and/or on the ground, which are configured as position-velocity sensors or acceleration sensors to measure vibrations, and the vibrations are actively counteracted using actuators. In particular Lorentz motors are used as the actuators.

A problem is that vibration isolation systems do not always only have the task to isolate the anti-vibration mounted load from vibrations from the environment, but that the anti-vibration mounted load likewise causes vibrations. In particular, photolithography steppers comprise a displaceable table which causes an acceleration of the anti-vibration mounted load in one direction or another when altering the direction or speed thereof.

Such vibrations caused by the anti-vibration mounted machine itself can be reduced by means of active vibration isolation using actuators, such as Lorentz motors.

A problem, however, is that there is a tendency of increasing the size of such lithography apparatus, which involves a correspondingly greater moving mass. Accordingly, the counteracting forces generated by the actuators have to be increased correspondingly, which makes the configuration of appropriate actuators more and more complex.

Published patent application EP 2 295 829 A1 (Integrated Dynamics Engineering GmbH) discloses a vibration isolation system in which, additionally, the pneumatic springs are used to provide counteracting forces.

However, pneumatic springs are only useful to provide counteracting forces in a vertical direction. Moreover, pneumatic springs which are controlled by means of valves exhibit a delayed response behavior, so that in case of very fast motions of the anti-vibration mounted load compensation is not sufficiently possible.

OBJECT OF THE INVENTION

Therefore, an object of the invention is to mitigate the drawbacks of the prior art.

More particularly, a vibration isolation system is to be provided, which enables to compensate in a simple manner for forces produced by motions of the anti-vibration mounted load, in particular by motions of a displaceable table. In particular, the need for ever increasing force actuators should be avoided.

SUMMARY OF THE INVENTION

The object of the invention is already achieved by a stationary vibration isolation system and a method for controlling a vibration isolation system according to any of the independent claims.

Preferred embodiments and modifications of the invention are set forth in the respective dependent claims.

The invention relates to a stationary vibration isolation system intended to accommodate machines in vibration-isolated manner, in particular lithography apparatus. The stationary vibration isolation system is in particular intended to receive photolithography steppers.

The system comprises a load that is anti-vibration mounted in both the horizontal and vertical directions. The load typically comprises a frame or table on which the lithography apparatus is arranged.

Furthermore, the anti-vibration mounted load comprises a moving mass. The moving mass in particular is a displaceable table such as those used in photolithography steppers.

Due to changes in motion of the moving mass such as alterations in speed and alterations of direction, a force is produced which may result in undesirable motions of the anti-vibration mounted load.

Typically, such a force mainly acts in a horizontal direction.

According to the invention, the anti-vibration mounted load is coupled to the base via a damper which is effective at least in horizontal direction, and which damper comprises a fluid of variable viscosity.

The base of a vibration isolation system typically defines a frame which rests on the ground. However, it is also conceivable to use the ground itself as a base of the vibration isolation system and to install springs and dampers directly on the ground.

The at least one damper couples the base with the anti-vibration mounted load and is able to absorb vibrations, at least temporarily.

The gist of the invention is to use a fluid of variable viscosity.

By using a fluid of variable viscosity, a mechanical coupling of the anti-vibration mounted load and the base may be induced temporarily. In this manner, in particular force impacts of displaceable tables can be diverted to the base.

The subject-matter of the invention benefits from the fact that the movements of steppers are usually quite rapid, whereas a vibration isolation system is especially intended to counteract slow movements, in particular of less than 100 Hz.

In case of such slow movements, the fluid of variable viscosity merely acts as a slightly viscous damping element.

Upon changes in motion of the anti-vibration mounted load, however, a very high damping effect is provided by virtue of an increasing viscosity, which damping is in particular at least ten times greater, and so the force is diverted to the base.

In this way, forces generated by motions of the anti-vibration mounted load can be offset at least partially by a frictional connection to the base.

The actively controlled force actuators, in particular Lorentz motors, which preferably continue to be provided, need no longer be adapted so that they are able to compensate for all the forces produced by the anti-vibration mounted load itself.

A non-Newtonian fluid may be used as the fluid of variable viscosity.

In a non-Newtonian fluid, the viscosity of the fluid increases with the shear rate.

Thus, the damping effect of the damper increases with the rapid movements of a displaceable table of a lithography stepper. This system may be employed as a purely passive system without electronic control.

Further, an electrorheological or magnetorheological fluid may be used as the fluid.

Electrorheological and magnetorheological fluids are materials in which the viscosity may be altered very quickly by an electric or magnetic field.

Such fluids are particularly known from active shock absorbers, such as those used in motor vehicles.

The use of an electrorheological or magnetorheological fluid allows the damper to be integrated into an active vibration isolation system.

It is in particular possible to provide an active control which detects the motion of the mass and based thereon controls the viscosity of the electrorheological or magnetorheological fluid.

In particular so-called feed-forward control may be provided, in which the motion of the anti-vibration mounted mass, in particular the motion of a displaceable table, is not only detected passively using a sensor, but in which the known motion pattern of the table is used to generate compensation signals so to speak in advance.

In one modification of the invention, the anti-vibration mounted load is additionally coupled to the base in the vertical direction via a damper which comprises a fluid of variable viscosity.

In this way, vertical force components may also be compensated for.

In one embodiment of the invention, the fluid of variable viscosity is arranged in a vibration isolator.

In particular it is possible to use a vibration isolator configured as a pneumatic spring, in which the piston has an extension which is immersed in a chamber containing the fluid of variable viscosity.

An advantage of this embodiment of the invention is that all components of the damper may be incorporated in the isolators.

In an alternative embodiment of the invention, the damper is configured as an external component, which in particular provides for retrofitability of a conventional vibration isolation system in a simple manner.

The invention further relates to a method for controlling a vibration isolation system that comprises a lithography apparatus including a moving mass.

Based on the movement of the mass, a damper which is effective at least in a horizontal direction and which comprises an electrorheological or magnetorheological fluid is controlled so that the damping effect increases upon a change in motion of the mass, i.e. in the event of an acceleration applied on the system by the mass.

The change in motion of the mass may be detected by a sensor.

Preferably in this case, known motion information, in particular that of a displaceable table, is accounted for in controlling the damper.

Preferably, at least one sensor detects vibrations of the anti-vibration mounted load and/or of the ground, and based thereon actuators are controlled for active vibration isolation, in particular Lorentz motors.

In one modification of the invention, both the vibration of the ground or of the lithography apparatus detected by the sensors and the detected motion of the mass are considered in calculating a signal for controlling the actuator.

The motion of the mass, in particular of the displaceable table, is not only used for controlling the damper in feed-forward control, but also for controlling the actuator.

DETAILED DESCRIPTION

The subject matter of the invention will now be explained in more detail with reference to the drawings of FIGS. 1 to 6 by way of schematically illustrated exemplary embodiments.

Figure 1:
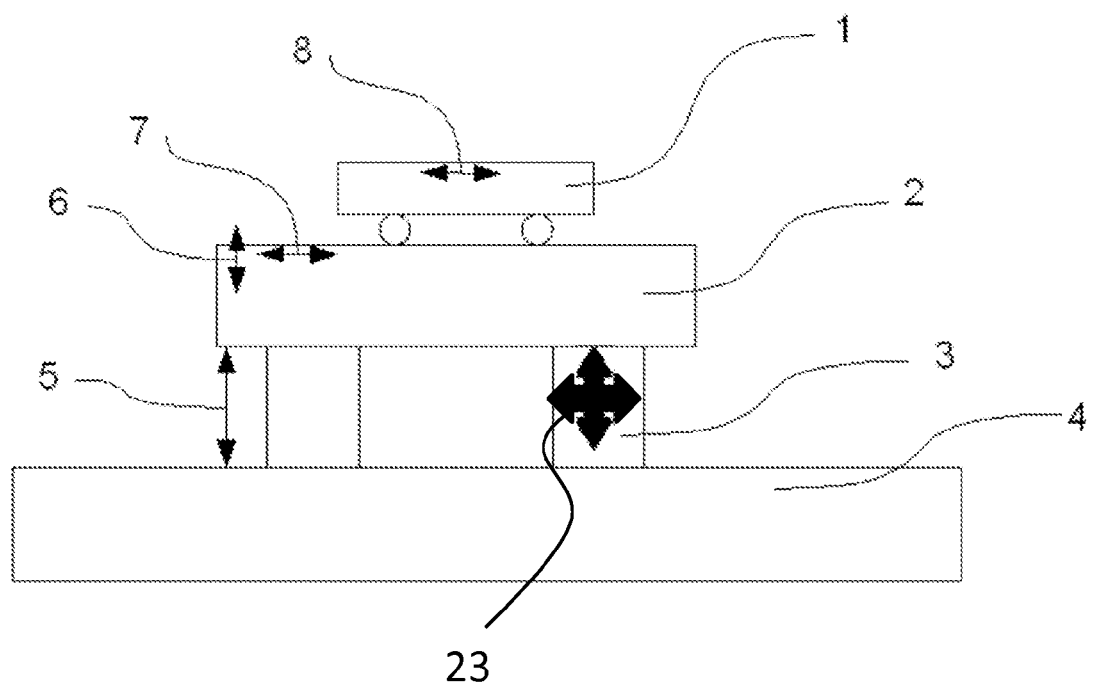
FIG. 1 schematically illustrates an exemplary active vibration isolation system.

FIG. 1 schematically illustrates an exemplary active vibration isolation system.

In this vibration isolation system, the ground 4 is used as a base for receiving an anti-vibration mounted load 2. The anti-vibration mounted load 2 is coupled with the ground 4 via vibration isolators 3 which are typically configured as a pneumatic spring.

Furthermore, the vibration isolation system comprises sensors. In this exemplary embodiment, sensor 5 is provided as a position sensor, sensor 6 as a speed or acceleration sensor of the anti-vibration mounted load 2 in the vertical direction, and sensor 7 as a sensor effective in the horizontal direction.

By virtue of sensors 5, 6, 7 it is possible to use compensating signals to control an actuator 23, by means of a control device (not shown).

In this exemplary embodiment, actuator 23 is integrated in vibration isolator 3. In particular a Lorentz motor is used as the actuator.

Actuator 23 is effective both in the horizontal and vertical directions in this exemplary embodiment.

The anti-vibration mounted load 2 comprises a lithography apparatus 1 which in this exemplary embodiment is configured as a displaceable table of a stepper that changes its direction of movement 8. Due to the acceleration caused thereby, forces are applied to the anti-vibration mounted load 2.

The vibrations or motions of the anti-vibration mounted load 2 in form of a table together with components placed thereon may be counteracted by controlling actuator 23.

However, with increasing size of the lithography apparatus 1, bigger and bigger actuators are required.

Figure 2:
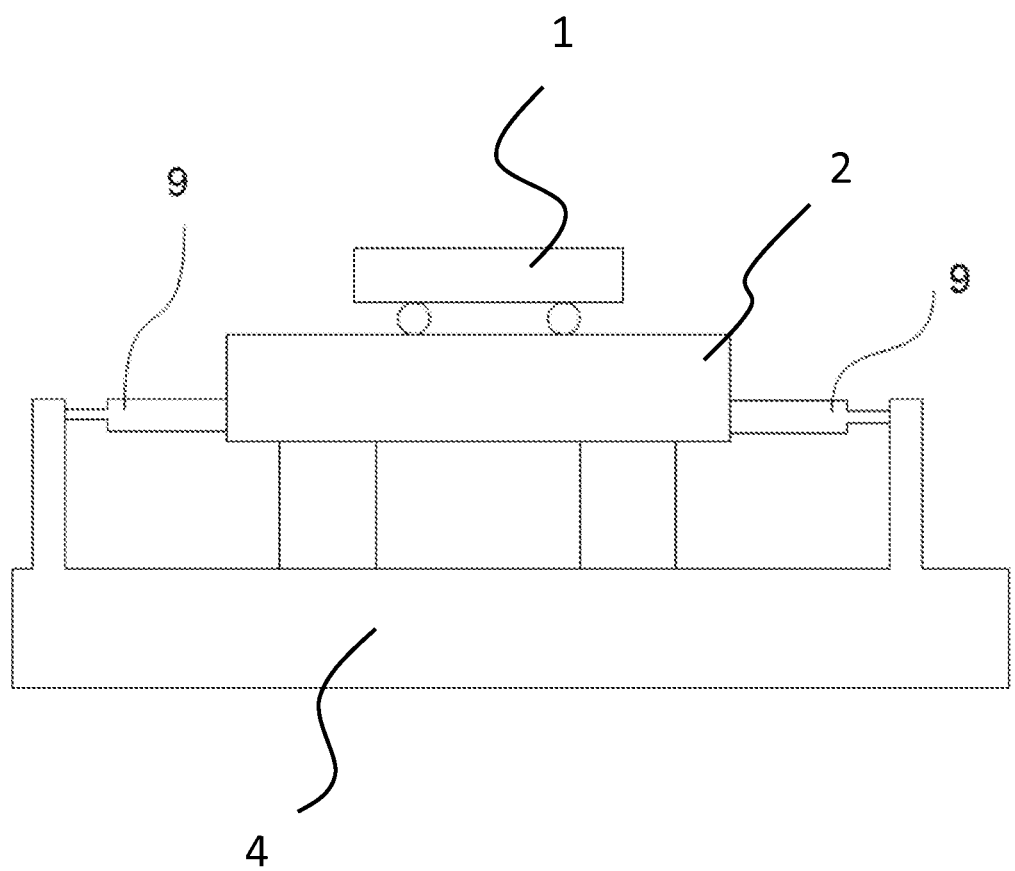
FIG. 2 illustrates the anti-vibration mounted load 2 coupled with the base or ground 4 via dampers 9.

Therefore, according to the invention, the anti-vibration mounted load 2 may be coupled with the base or ground 4 via dampers 9, as shown in FIG. 2.

Dampers 9 comprise a fluid of variable viscosity (not shown), so that the damping effect is variable.

Forces applied by the lithography apparatus 1 as a result of a motion of the displaceable table may now be diverted to the ground 4, due to a frictional connection via dampers 9, so that the requirements on the actuators of the system are reduced.

Figure 3:
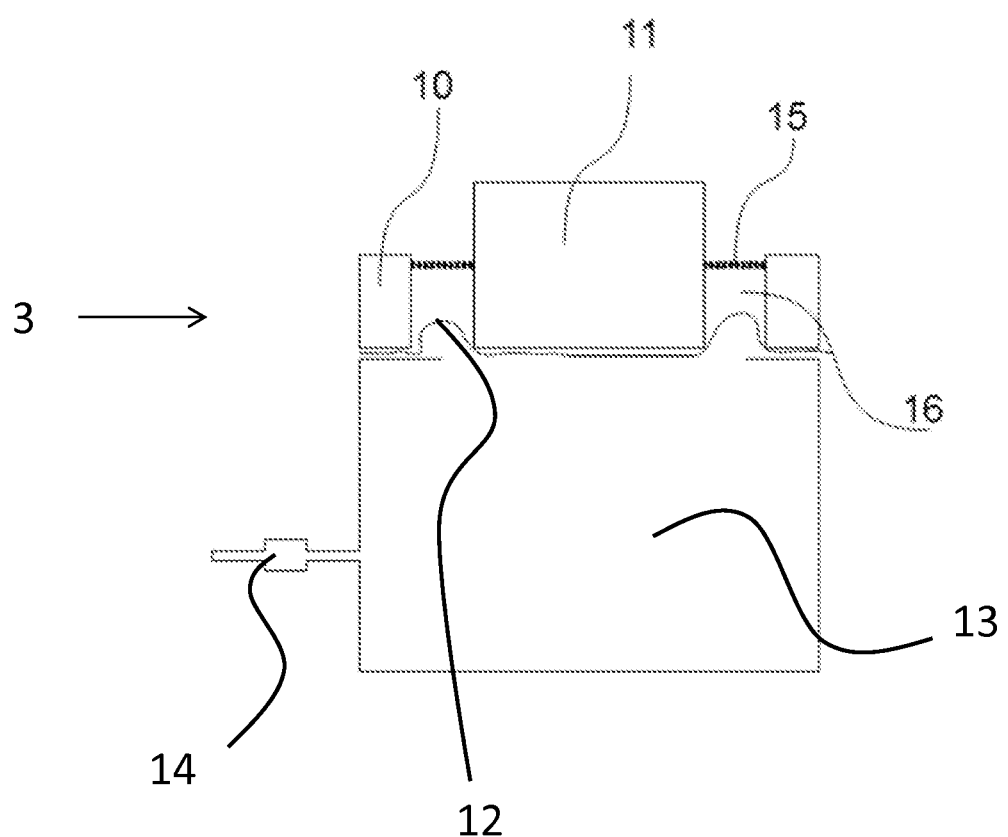
FIG. 3 schematically illustrates a vibration isolator 3 in which the fluid of the damper is integrated in the vibration isolator 3.

FIG. 3 schematically illustrates a vibration isolator 3 in which the fluid of the damper is integrated in the vibration isolator 3.

Vibration isolator 3 is configured as a pneumatic spring and includes a working space 13.

A preferably controllable valve 14 may be used to control the pressure in the working space 13.

Vibration isolator 3 further comprises a piston 11 on which the anti-vibration mounted load rests.

Working space 13 is sealed on the piston side by a membrane 12 which is secured on the housing of working space 13 by means of a clamping ring 10.

Above membrane 12, a seal 15 is arranged which enables to introduce a fluid between membrane 12 and seal 15, in particular a liquid of variable viscosity.

Fluid 16 may be a non-Newtonian fluid, for passively changing the damping effect, or an electrorheological or magnetorheological fluid, for actively changing the damping effect.

If now, due to a change of motion of a displaceable table, a force, in particular a horizontal force, is applied to the piston 11 which is rigidly connected to the anti-vibration mounted load, the viscosity of fluid 16 can be increased, whereby a frictional connection is established between piston 11 and clamping ring 10.

At least horizontal force components may be diverted to the base in this manner, at least partially.

Figure 4:
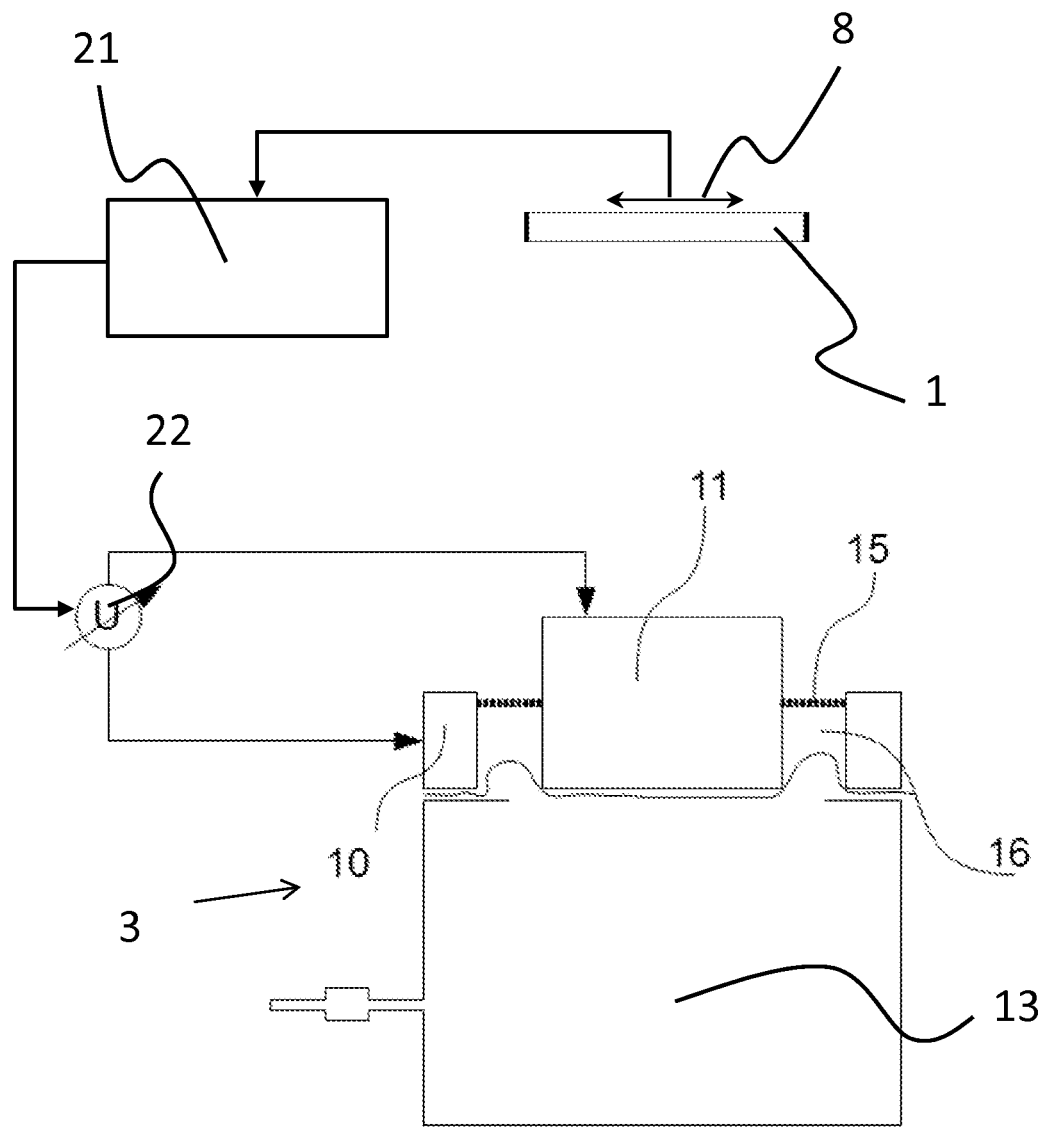
FIG. 4 shows another schematic view, in which the illustrated vibration isolator is configured as a pneumatic spring including a working space 13.

FIG. 4 shows another schematic view, in which the illustrated vibration isolator substantially corresponds to the vibration isolator shown in FIG. 3, being configured as a pneumatic spring including a working space 13.

A fluid 16 of variable viscosity is arranged between piston 11 and clamping ring 10. In this exemplary embodiment, the fluid is an electrorheological fluid 16.

When installed in a vibration isolation system, isolator 3 is controlled by a control device 21. Control device 21 is connected to the lithography apparatus 1. Changes in the direction of movement 8 of the displaceable table are communicated from lithography apparatus 1 to control device 21. Based on this change of motion, the control device determines the force generated by lithography apparatus 1 and based thereon controls the power source 22 by means of which the viscosity of fluid 16 is controlled.

Thus, the vibration isolation system comprises a feed-forward control which in the event of forces caused by the lithography apparatus, preliminarily achieves a frictional connection between the anti-vibration mounted load and the base.

It will be understood that control device 21 moreover may be part of an active control and may additionally control actuators for active vibration isolation (23 in FIG. 1).

Figure 5:
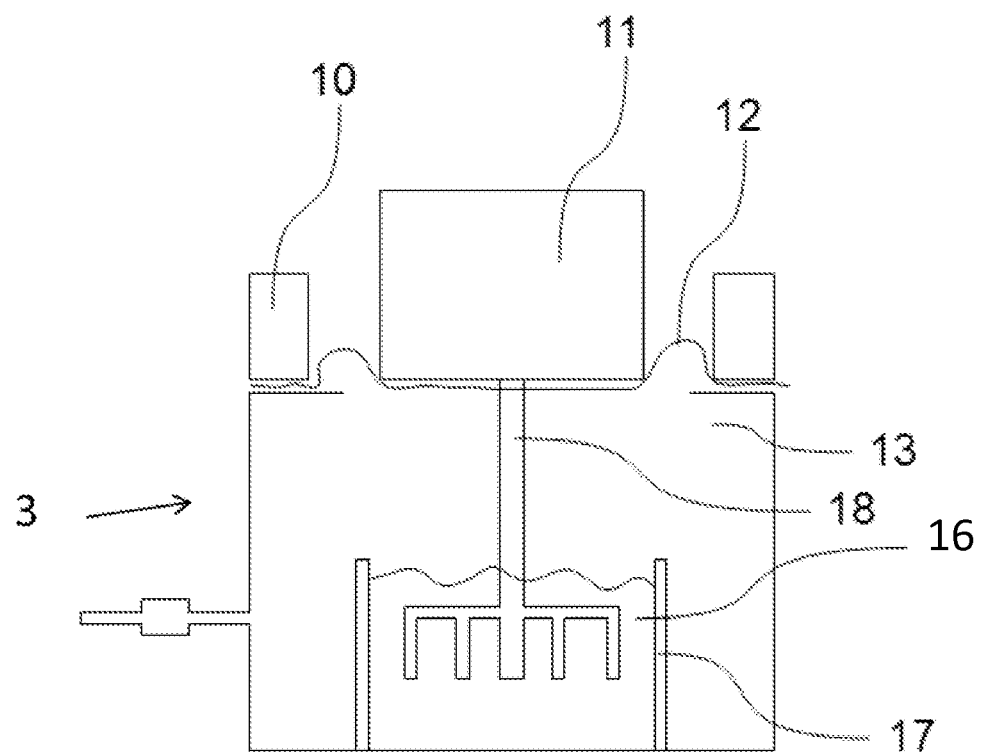
FIG. 5 shows another exemplary embodiment of a vibration isolator 3 which is likewise configured as a pneumatic spring including a working space 13.

FIG. 5 shows another exemplary embodiment of a vibration isolator 3 which is likewise configured as a pneumatic spring including a working space 13.

This vibration isolator 3 likewise comprises a piston 11.

Working space 13 is sealed by a membrane 12, which is secured on the housing of the working space by means of clamping ring 10.

In this exemplary embodiment, piston 11 has an extension 18 which projects into the working space 13 of the isolator.

Within working space 13, a chamber 17 is provided which is filled with a fluid 16 of variable viscosity.

If the fluid is an electrorheological fluid, the viscosity of the fluid 16 may be controlled by applying a voltage between the wall of chamber 17 and extension 18.

Figure 6:
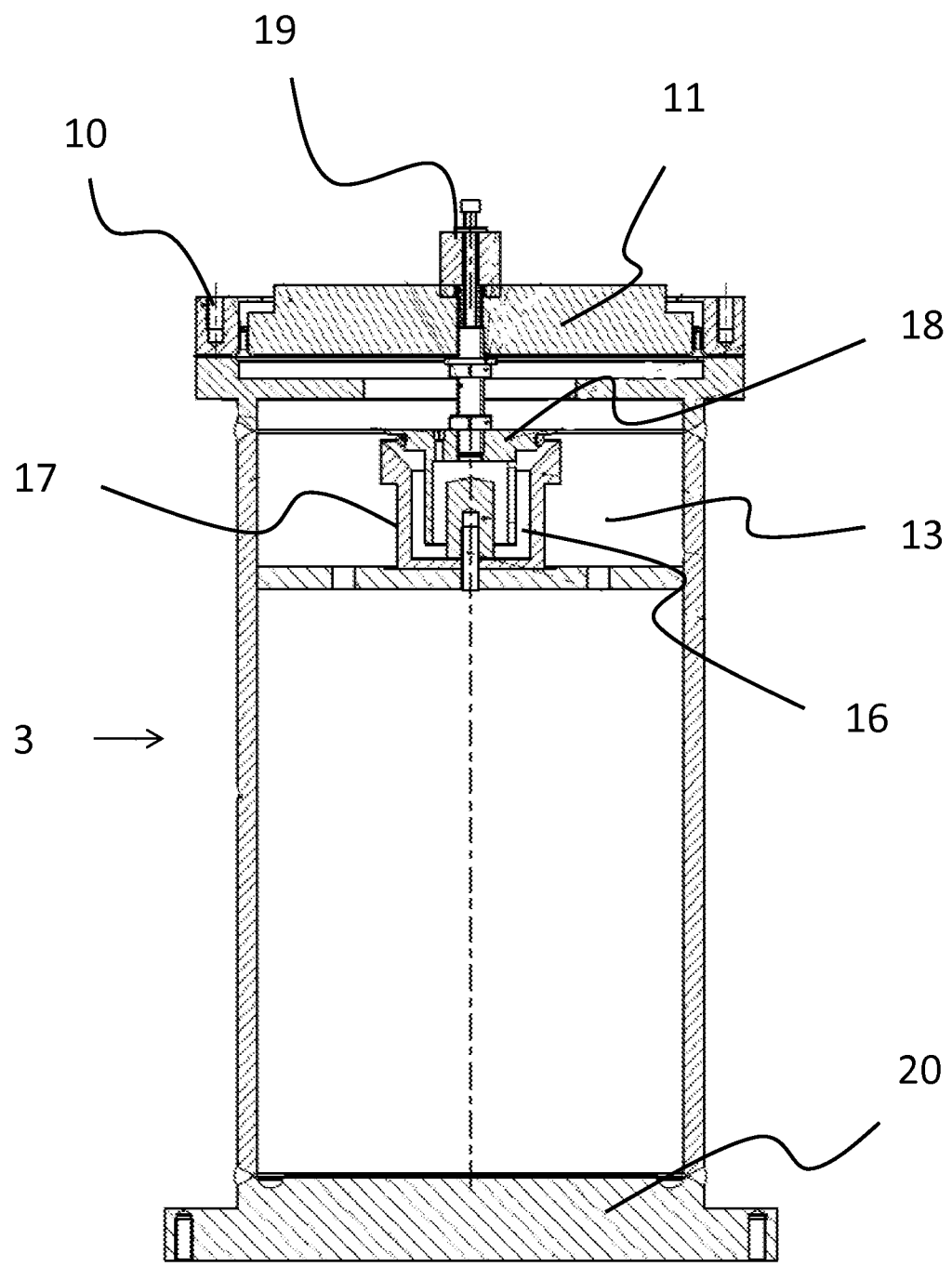
FIG. 6 shows a sectional view of a practical vibration isolator 3.

FIG. 6 shows a sectional view of a practical vibration isolator 3.

It comprises working space 13.

Piston 11 is movable relative to the working space both in the horizontal and vertical directions and may be fixed to the anti-vibration mounted load by means of fastening element 19.

Furthermore, clamping ring 10 can be seen, by means of which the working space is sealed using a membrane.

The piston now comprises extension 18 which projects into the preferably sealed chamber 17 which is arranged within the working space and which comprises a fluid 16 of variable viscosity.

Vibration isolator 3 further comprises a foot 20 by means of which it may be fixed on the ground or on a base.

By increasing the viscosity of fluid 16, a frictional connection may be achieved between piston 11 and the housing of working space 13 and thus ultimately between the anti-vibration mounted load and the base.

The invention permits in a very simple manner to divert forces which are caused by an anti-vibration mounted load, in particular by a stepper, to the ground, at least partially, so that they do not need to be completely counteracted by actuators.

LIST OF REFERENCE NUMERALS

1 Lithography apparatus
2 Load
3 Vibration isolator
4 Ground
5 Sensor
6 Sensor
7 Sensor
8 Direction of movement
9 Damper
10 Clamping ring
11 Piston
12 Membrane
13 Working space
14 Valve
15 Seal
16 Fluid
17 Chamber
18 Extension
19 Fastening element
20 Foot
21 Feedback control device
22 Power source
23 Actuator

What is claimed is:
1. A stationary vibration isolation system, comprising:
a load that is anti-vibration mounted in a horizontal direction and vertical direction on a base and which comprises a moving mass;

wherein the vibration-isolated load is coupled to the base via a first damper which is effective in the horizontal direction and which comprises a first fluid of variable viscosity, and wherein viscosity of the first fluid of variable viscosity increases as a direct consequence of changes in motion of the load in a horizontal direction.

2. The stationary vibration isolation system as claimed in claim 1, wherein the fluid is a non-Newtonian fluid.

3. The stationary vibration isolation system as claimed in claim 1, wherein the vibration isolation system which is an active vibration isolation system comprises at least one sensor for detecting vibrations of the anti-vibration mounted load and/or of the ground, and at least one actuator for actively reducing vibrations.

4. The stationary vibration isolation system as claimed in claim 3, wherein the actuator is a magnetic actuator.

5. The stationary vibration isolation system as claimed in claim 1, wherein the vibration-isolated load is coupled to the base via a second damper which is effective in the vertical direction and which comprises a second fluid of variable viscosity.

6. The stationary vibration isolation system as claimed in claim 1, wherein the first damper, which comprises the first fluid of variable viscosity, is arranged in a vibration isolator.

7. The stationary vibration isolation system as claimed in claim 6, wherein the vibration isolator is a pneumatic spring that is effective in vertical and horizontal directions.

8. The stationary vibration isolation system as claimed in claim 7, wherein the pneumatic spring comprises a piston that has an extension which is immersed in a chamber containing the fluid of variable viscosity.

9. A method for controlling a vibration isolation system, wherein said vibration isolation system comprises a lithography apparatus including a moving mass, wherein the method comprises:

(a) passively damping, via a fluid of variable viscosity, at least some vibrations sourced from horizontal motion of the lithography apparatus; and (b) actively controlling, via actuators, at least some vibration sourced from an external environment, wherein, either directly or indirectly, due to said some vibrations sourced from horizontal motion of the lithography apparatus, viscosity of the fluid increases thereby stiffening the vibration isolation system and reducing an amount of vibration control provided by the actuators.

10. The method for controlling a vibration isolation system as claimed in claim 9, wherein the lithography apparatus is a stepper.

11. The method for controlling a vibration isolation system as claimed in claim 9, wherein the moving mass is a displaceable table.

12. The method for controlling a vibration isolation system as claimed in claim 9, comprising detecting vibrations of the lithography apparatus or of the ground by at least one sensor, and controlling at least one actuator for active vibration isolation based on the detected vibrations.

13. The method for controlling a vibration isolation system as claimed in claim 12, wherein in calculating a signal for controlling the actuator, both the vibrations of the ground or of the lithography apparatus detected by the at least one sensor and the detected motion of the mass are considered.

14. A stationary vibration isolation system, comprising
a load that is anti-vibration mounted in a horizontal direction and vertical direction on a base and which comprises a moving mass;
a damper that comprises a fluid of variable viscosity, wherein the damper is effective in the horizontal direction for coupling at least some vibrations from the load to the base; and
an actuator that actively reduces at least some vibrations sourced from an external environment and introduced into the stationary vibration isolation system, wherein the damper functions independently of the actuator.

15. The stationary vibration isolation system of claim 14 and further wherein viscosity of the fluid increases as a direct consequence of changes in motion of the load.

16. The stationary vibration isolation system of claim 14 and further wherein the fluid of variable viscosity comprises an electrorheological fluid or a magnetorheological fluid, and wherein the stationary vibration isolation system further comprises:
a sensor for sensing motion of the load; and
a control circuit that controls viscosity of the fluid of variable viscosity.

17. The stationary vibration isolation system of claim 14 and further wherein the damper and the actuator are co-located in a vibration isolator.

18. The stationary vibration isolation system of claim 14 wherein the vibration isolator is a pneumatic spring that is effective in vertical and horizontal directions.

19. The stationary vibration isolation system of claim 14 and further wherein the damper is arranged so that it wherein the damper is effective in the vertical direction for coupling at least some vibrations from the load to the base.

* * * * *